US011097758B1

(12) United States Patent
Lee

(10) Patent No.: US 11,097,758 B1
(45) Date of Patent: Aug. 24, 2021

(54) SYSTEM AND METHOD FOR A VIDEO GAME STORAGE PORTABILITY CART

(71) Applicant: Rachelle Lee, Mill Creek, WA (US)

(72) Inventor: Rachelle Lee, Mill Creek, WA (US)

( * ) Notice: Subject to any disclaimer, the term of this patent is extended or adjusted under 35 U.S.C. 154(b) by 0 days.

(21) Appl. No.: 17/189,080

(22) Filed: Mar. 1, 2021

Related U.S. Application Data

(60) Provisional application No. 63/108,323, filed on Oct. 31, 2020.

(51) Int. Cl.
*B62B 3/02* (2006.01)
*B62B 5/06* (2006.01)
*B62B 5/04* (2006.01)

(52) U.S. Cl.
CPC .............. *B62B 3/02* (2013.01); *B62B 5/0457* (2013.01); *B62B 5/06* (2013.01); *B62B 2202/56* (2013.01)

(58) Field of Classification Search
CPC ............ B62B 3/02; B62B 5/0457; B62B 5/06
See application file for complete search history.

(56) References Cited

U.S. PATENT DOCUMENTS

2007/0228680 A1* 10/2007 Reppert ................ A61J 7/0069
280/47.35
2015/0187231 A1* 7/2015 Stephanian ........ H04N 5/23293
434/267

* cited by examiner

*Primary Examiner* — John D Walters
*Assistant Examiner* — James J Triggs
(74) *Attorney, Agent, or Firm* — Christopher Mayle; Bold IP, PLLC

(57) ABSTRACT

A system and method for an entertainment storage portability cart that is able to securely house and run new entertainment systems as they are released utilizing customizable configurations that may be used in various locations including a hospital or a library as well as used for various E-Sport events, whereby the system provides a series of security storage cases that may be exchanged and replaced to appropriately secure any entertainment system, the security storage cases designed to prevent tampering and theft, be securely mounted to the body of the entertainment storage portability cart, allow proper ventilation to the entertainment console enclosed inside of the storage case, provide proper access points to the ports and buttons of the entertainment console, and secure the entertainment console within the case to prevent unwanted movement during transportation of the entertainment storage portability cart.

19 Claims, 7 Drawing Sheets

SYSTEM AND METHOD FOR A VIDEO GAME STORAGE PORTABILITY CART

CROSS REFERENCE TO RELATED APPLICATIONS

The application is a U.S. Non-Provisional Patent Application which claims priority to U.S. Provisional Patent Application No. 63/108,323 filed on Oct. 31, 2020 which is incorporated by reference in its entirety.

FIELD OF DISCLOSURE

The overall field of this invention is a system and method for storage portability carts, more particularly, the invention is directed to a video game storage portability cart designed to hold various video gaming systems or other electronic devices connectable to an attached television whereby the system is durable for heavy duty use and optimal for customization.

BACKGROUND

Hospitals report a significant increase in patient satisfaction scores when gaming systems are available to the patients. Gaming systems has also been a staple in Esports, corrections, and assisted living centers. Presently there are thousands of children and their families enjoying Minecraft for the Xbox One or Animal Crossing for the Nintendo Switch in hospitals all across the country. Fully loaded electronic systems make it easy for Child Life Specialists to provide entertainment to their patients. However there are many difficulties in providing a storage portability cart to house the gaming systems and other entertainment devices.

Many conventional storage portability carts are not secure whereby in a public environment other individuals may steal parts of the entertainment console or accessories. These storage portability carts also typically are not as durable as needed for multiple users and constant transportation in a hospital environment. Another problem with conventional storage portability carts is that the storage portability carts are designed to only accommodate one entertainment system in a single housing whereby the user must now try to squeeze in new entertainment systems that may have different dimensions or completely purchase a new storage portability cart. Thus there is a need for a new and improved system and method for an entertainment storage portability cart.

SUMMARY

The disclosure herein relates to an entertainment storage portability cart comprising a base, a support column connected to the base, a toggle connected to the support column, a display connected to the toggle, one or more storage cases removably connected to the support column, the one or more storage cases each configured to hold one or more specific entertainment systems, wherein the one or more storage cases are replaceable from the support column, further comprising wheels connected to a bottom surface of the base wherein the wheels are position lockable to prevent movement, wherein the support column has a hollow cavity to facilitate the routing of cords, further comprising a utility box mounted to the support column, the utility box having an open back end such that cords are movable from the support column into an interior of utility box through the open back end, a power strip inside of the utility box, the power strip having a plurality of female power receptacles to receive a series of male adapters from the cords, comprising a power strip inside of the utility box, the power strip having a plurality of female power receptacles to receive a series of male adapters from the cords, a rechargeable battery of charge, design, and capacity, to provide sufficient power to the display and one or more entertainment systems secured in storage box while operating the one or more entertainment storage portability carts for a set period of time, wherein the toggle is in a pivotable relationship with the support column such that the display is adjustable with different orientations, the toggle having a bracket for connection to a rear surface of the display, further comprising a handle connected to the support column, the handle having a hook element configured to allow the cords to be wound about the hook element for storage during transportation, the handle having a grasping element configured to allow a user to grab the grasping element to transport the entertainment storage portability cart, wherein the one or more storage cases have a series of specially designed apertures to prevent obstruction and allow airflow from the one or more entertainment systems, wherein the one or more storage cases have a body and a lid, the lid connected to the body by one or more hinges, wherein the one or more storage cases have a body and a lid, the lid connected to the body by one or more hinges, wherein the one or more storage cases are made of durable optically clear or opaque cast acrylic sheets, wherein the one or more storage cases have a locking system configured to prevent unwanted access into the body of the of the one or more storage cases, wherein the one or more storage cases have one or more stabilizing pieces integrated within an interior of the body such that when the one or more entertainment systems are positioned inside the body, the one or more entertainment systems are partially suspended, wherein the one or more storage cases are connected to one or more accessory mounts configured to hold one or more accessories, wherein the one or more accessory mounts are made of material such that the one or more accessory mounts are flexible without deformation.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

Figure 1:
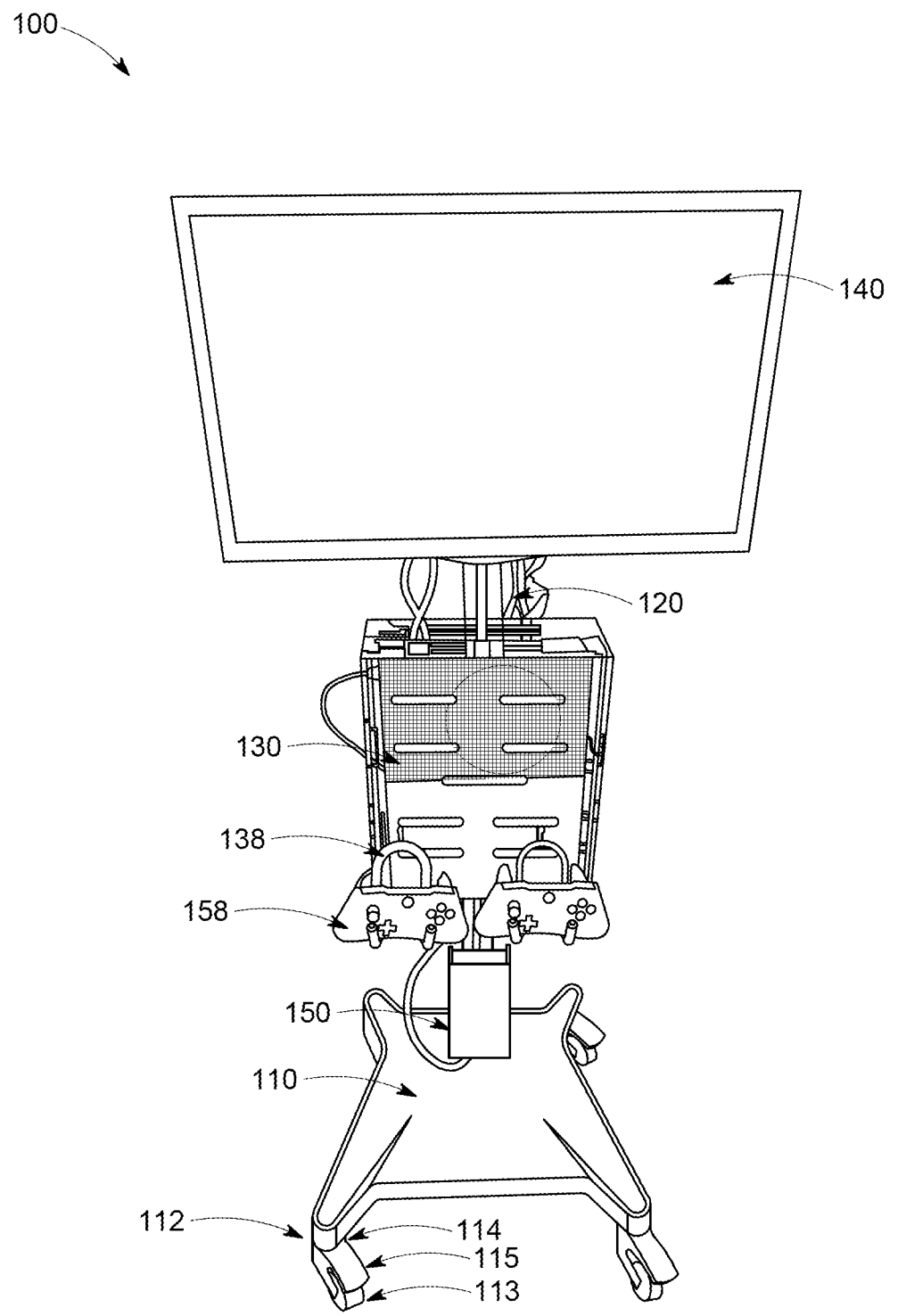
FIG. 1 depicts an illustration of a front perspective view of one embodiment of the entertainment storage portability cart.

In the Summary above and in this Detailed Description, and the claims below, and in the accompanying drawings, reference is made to particular features of the invention. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

"Exemplary" is used herein to mean "serving as an example, instance, or illustration." Any aspect described in this document as "exemplary" is not necessarily to be construed as preferred or advantageous over other aspects.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any item, so a "set of items," may indicate the presence of only one item, or may indicate more items. Thus, the term "set" may be equivalent to "one or more" as used herein.

In the following detailed description, numerous specific details are set forth in order to provide a more thorough understanding of the one or more embodiments described herein. However, it will be apparent to one of ordinary skill in the art that the invention may be practiced without these specific details. In other instances, well-known features have not been described in detail to avoid unnecessarily complicating the description.

The present disclosure recognizes the unsolved need for an improved system and method for an entertainment storage portability cart that is able to securely house and run new entertainment systems as they are released utilizing customizable configurations. The system may be used in various locations including a hospital or a library as well as used for various E-Sport events. The system provides a series of security storage cases that may be exchanged and replaced to appropriately secure any entertainment system. The storage case is designed to prevent tampering and theft, be securely mounted to the body of the entertainment storage portability cart, allow proper ventilation to the entertainment console enclosed inside of the storage case, provide proper access points to the ports and buttons of the entertainment console, and secure the entertainment console within the case to prevent unwanted movement during transportation of the entertainment storage portability cart.

FIG. 1 depicts a non-limiting embodiment of an entertainment storage portability cart 100 in accordance with the present invention. Entertainment storage portability cart 100, in one or more embodiments of the present description, may include, without limitation, several components, such as a base 110, a pole 120, a storage case 130, a display monitor 140, and a utility box 150. Entertainment storage portability cart 100 may be disinfected with bleach or other hospital grade disinfectants to prevent the sharing of germs between users.

Base 110 transfers the weight of pole 120, storage case 130, display monitor 140, and utility box 150 onto a floor surface. Base 110 may have a rectangular shape with semi-circular portions extending from corners of the rectangle. However this is non-limiting and base 110 may be of any shape such as a square, triangle, rhombus, parallelogram, hexagon, octagon, or any shape that may transfer the weight of the components of entertainment storage portability cart 100 onto the floor surface.

Wheel assemblies 112, each having a wheel 113 and a fork 114 surrounding and connecting to wheel 113 by an axle, may be connected beneath base 110 to provide movement of entertainment storage portability cart 100 with respect to the floor surface for transportation of entertainment storage portability cart 100 from one location to another location. Wheel assemblies 112 may have a brake assembly for fortifying entertainment storage portability cart 100 at a specific position. The brake assembly allows the user the opportunity to lock and unlock entertainment storage portability cart 100 with the user's foot or hand to prevent entertainment storage portability cart 100 from rolling unintentionally. The brake assembly may have a brake lever 115 pivotally connected to fork 114 whereby brake lever 115 may have a lock or on position and an unlock or off position. When brake lever 115 is in the lock or ON position, brake lever 115 may be pushed down by the user such that brake lever 115 comes in contact with wheel 113 thus preventing wheel 113 from rotating. When brake lever 115 is in the unlock or OFF position, brake lever 115 may be pulled back upward by the user such that brake lever 115 is no longer in contact with wheel 113, allowing wheels 113 to rotate and be mobile.

Pole 120 may extend vertically upward from a central cavity of base 110. Pole 120 may be elongated in shape and formed with a tubular or polygonal cross-section such that it has a substantially hollow core. The hollow construction of pole 120 enables the user to route electrical and data cables therethrough to both facilitate electrical interconnection to display monitor 140, an entertainment console in storage case 130 and to conceal the cables from view. To further facilitate such routing, one or more spaced apart apertures in pole 120 may provide for the ingress and egress of electrical cables being routed through the pole 120.

In some embodiments, pole 120 may include a rear U-shaped bracket and a front shaped T-shaped flap that is removable from from a receiving element in the U-shaped bracket whereby when the T-shaped flap is removed the user may access cords in the interior of pole 120. In further embodiments, the flap may be flat with protruding edges designed to fit over the U-shaped bracket. In other non-limiting embodiments, pole 120 may be telescopic and extendable with respect to base 110.

A utility box 150 may be mounted to pole 120 and positioned near an upper surface of base 110 whereby the interior of utility box 150 may be accessed by a flip top or other door. Utility box 150 may have an open back end such that cords and wiring are movable from pole 120 into the interior of utility box 150 through the open back end.

The inside of utility box 150 may have a power strip with a plurality of female power receptacles or outlets to receive a series of male adapters from power cords of display monitor 140 and an entertainment console secured in storage case 130 as well as any appropriate cables or wires connected between display monitor 140, associated electronic components located within the entertainment storage portability cart 100, and any external devices located outside entertainment storage portability cart 100. The power strip may have a hospital grade power cord capable of being extended outside an aperture at the bottom of utility box 150 to be plugged into an electrical outlet in the room where entertainment storage portability cart 100 is located.

In one or more non-limiting embodiments, pole 120 may be connected to a rechargeable battery 400 on the opposite side of utility box 150. However this is non-limiting and rechargeable battery 400 may be connected to any other portion. Rechargeable battery 400 is of a charge, design, and capacity, to provide sufficient power to display monitor 140 and an entertainment system secured in storage box 130 while operating entertainment storage portability cart 100 for a set period of time. Rechargeable battery 400 may be connected to the power strip by any conventional means such that rechargeable battery 400 may be charged when the power cord of the power strip is plugged into an electrical outlet in the room where entertainment storage portability cart 100 is located as well as provide power to display monitor 140 and an entertainment system secured in storage box 130.

Figure 2:
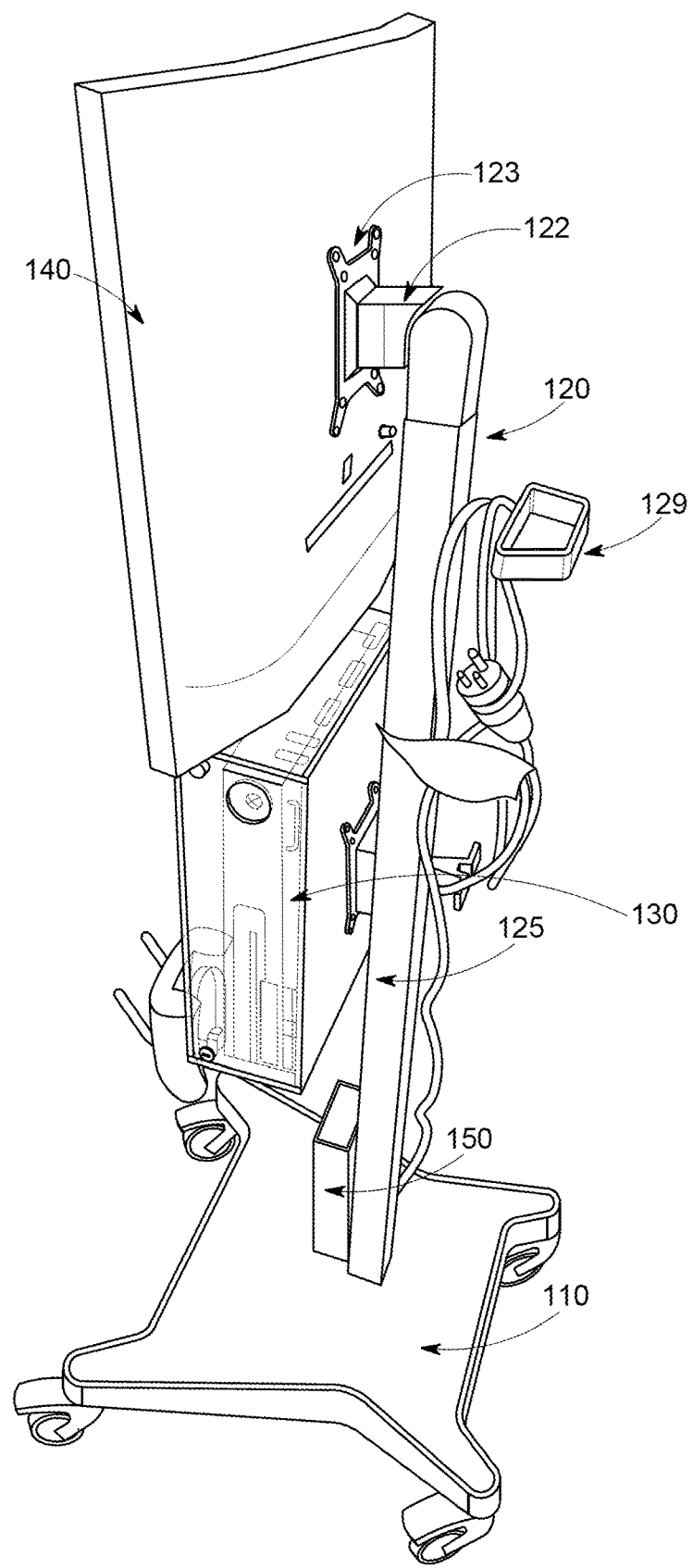
FIG. 2 depicts a side view of the embodiment in FIG. 1.

The top end of pole 120 may be connected to a first end of a toggle 122, as illustrated in FIG. 2, whereby pole 120 and toggle 122 are pivotally coupled together with an axle permitting rotational movement of toggle 122 to pole 120. This connection provides a wide range of different positions and altitudes of toggle 122 with respect to pole 120. As a result, a wide range of different positions and orientations of an attached display monitor 140 can be achieved. The axle is mounted in through a hole on toggle 122 and secured thereto with a fastener. The fastener may be any type of fasteners known in the art, including, but not limited to, any type of screw and/or nut and bolt combination. The axle has two distal ends extending out of the hole on toggle 122 that are supported in prongs at the top end of pole 120. While the materials of construction are not critical to the novel features of pole 120, toggle 122, and base 110, the material that is selected should provide sufficient strength and rigidity to support display monitor 140 and an entertainment system stored within storage case 130.

Toggle 122 may have a mounting member 123 or attachment plate at a second end of toggle 122 for connection of toggle 122 to a rear surface of display monitor 140 at a point above a bottom of display monitor 140 that is sufficient to stabilize the load from display monitor 140 and to prevent any lateral, forward, or rearward movement of pole 120. Mounting member 123 may be fastened to display monitor 140 in any of the conventional ways including bolts, screws, etc. Once fastened the pivotal connection between toggle 122 and pole 120 permits rotational movement of display monitor 140 with respect to pole 120 such that a user may orient display monitor 140 at multiple angles suitable for optimal viewing of the user at different elevations in the location where entertainment storage portability cart 100 is stationed.

Display monitor 140 may be a television type of monitor or display such as LED, LCD, plasma, CRT, or any type of display. For example, display monitor 140 may also be a computer display screen, touch screen display, video monitor, or television. Display monitor 140 may be digital and/or analog. Display monitor 140 may be a transparent surface that may receive a visual projection. Display monitor 140 may display a user interface on the display. Display monitor 140 may be of any size to provide an optimal playing experience for the user. In preferred embodiments, display monitor 140 is 24" diagonally but may be any shape or size depending on the dimensions of pole 120 and toggle 122. Display monitor 140 may be connected to a remote control capable of the controlling components of display monitor 140.

Pole 120 may be connected to a handle 129 below display monitor 140 and above storage case 130. Handle 129 may have a hook element and a grasping element extending outward from the hook element. The hook element allows the power cord of the power strip to be wound about the hook element for easy storage during transportation. The grasping element is designed to be held by the user to facilitate transportation from one location to another. The grasping element is depicted as trapezoidal in shape; however this is non-limiting and handle 129 may be a rectangle, circle, semicircle, hexagon, octagon, prism, horseshoe, rod, or any other suitable shape.

Figure 3:
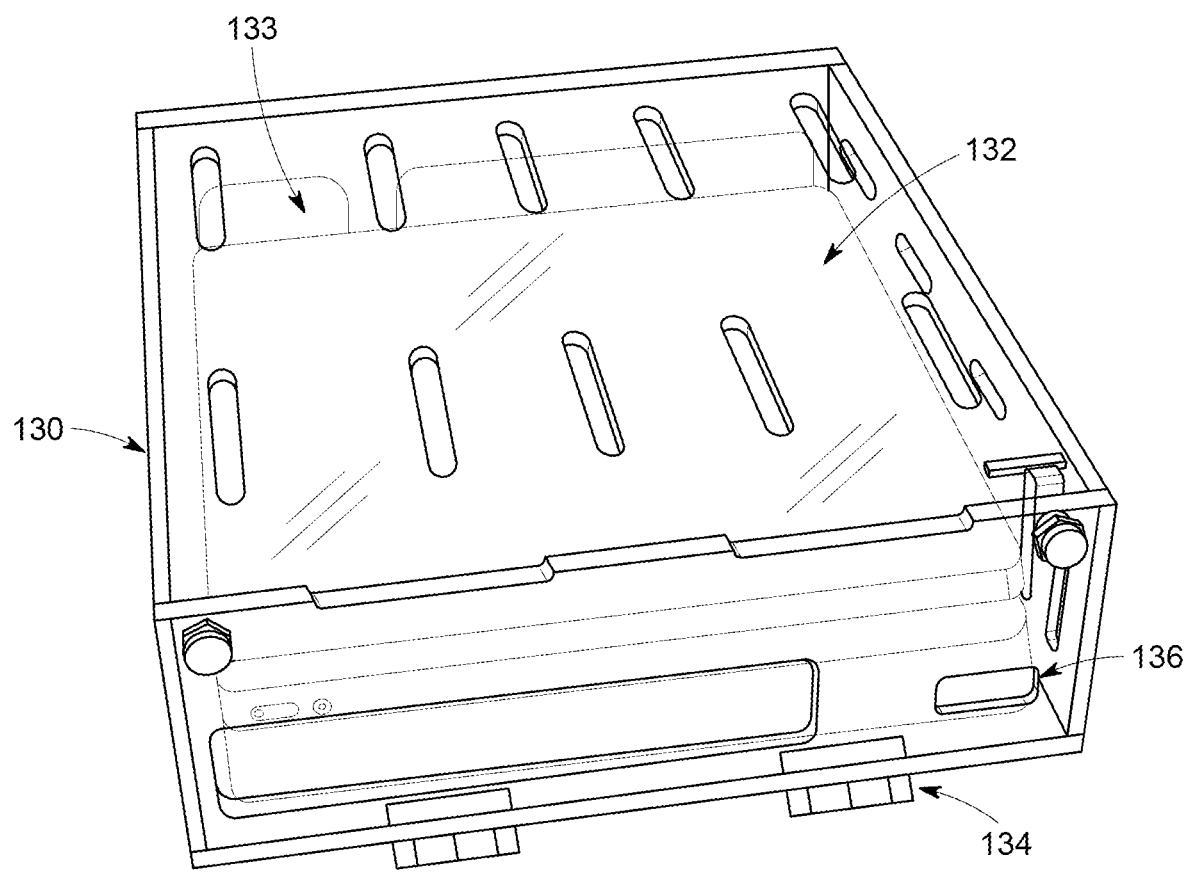
FIG. 3 depicts one embodiment of a storage case.
Figure 4:
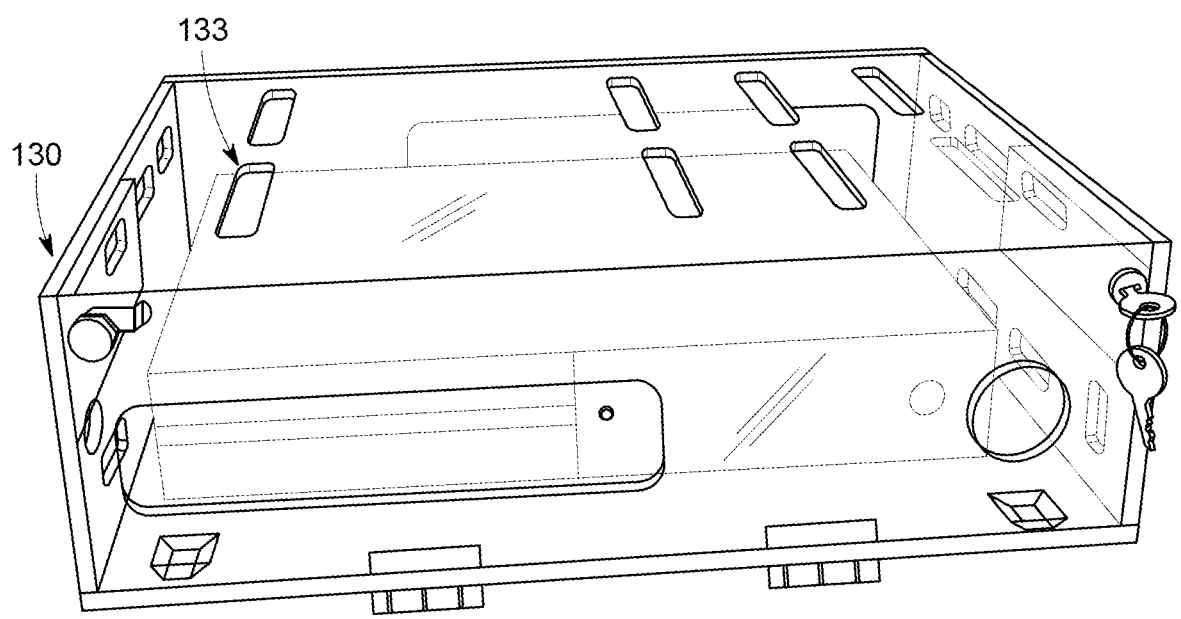
FIG. 4 depicts another embodiment of a storage case.
Figure 5:
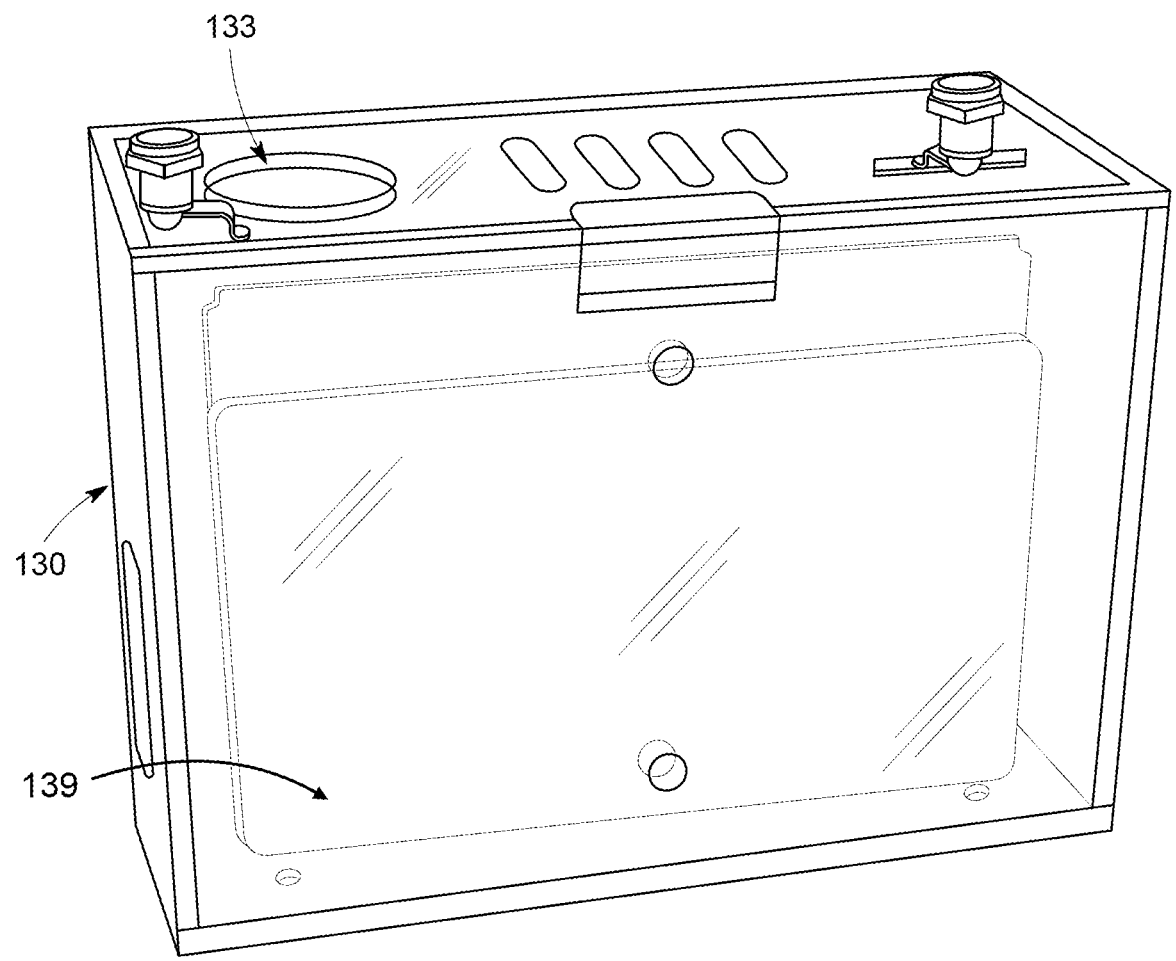
FIG. 5 depicts a third embodiment of a storage case.
Figure 6:
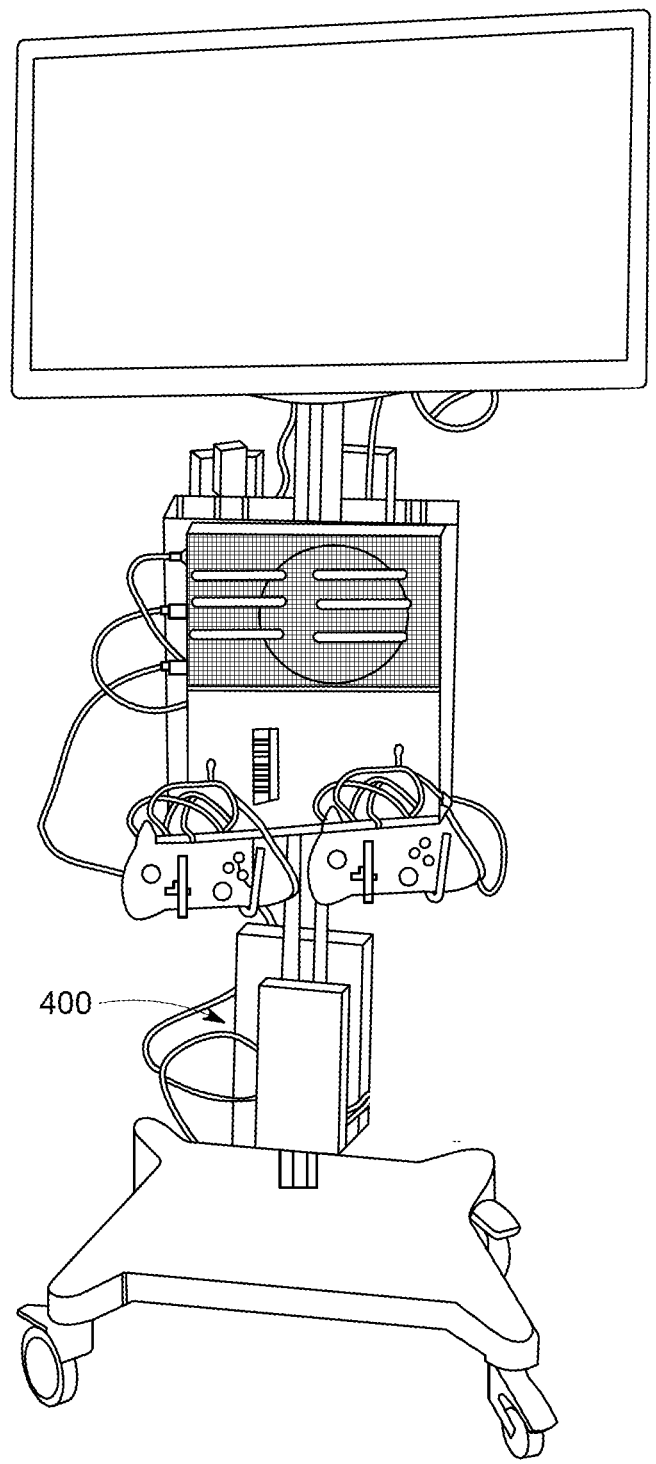
FIG. 6 depicts a perspective view of one embodiment of entertainment storage portability cart with a rechargeable battery.

As discussed, entertainment storage portability cart 100 may utilize one or more storage cases 130 such that the entire entertainment storage portability cart 100 does not need to be replaced when a new entertainment system of different dimensions is released. Each storage case 130 is custom built for receiving one or more specific types of entertainment systems such as PlayStation 5 digital, PlayStation 5 disc version, Xbox Series X, Xbox Series S, Nintendo Switch, or any video game consoles or electronic devices previously released or that may be released in the future. Entertainment systems may be connected by an HDMI, coaxial, AV video, or other cord to the display monitor 140 for viewing of content produced by the entertainment system. FIG. 3-5 illustrate some of the embodiments of cases that may be connected to and be a part of entertainment storage portability cart 100, including for a PlayStation 4, Xbox One, and Nintendo Switch.

Pole 120 may have a bracket 125 or attachment plate between the top end and bottom end of pole 120 for connection of a storage case 130 to a front surface of pole 120 at a point below display monitor 140. Bracket 125 may be removably fastened to a storage case 130 in any of the conventional ways whereby apertures 133 formed in storage case 130 allow bracket 125 to be universally mountable to any of a plurality of storage cases 130 having varied configurations. A storage case 130 may then be replaced with a second storage case when so desired.

As shown in FIG. 3, one embodiment of a transparent storage case 130 has a case body 132, a lid 136, and hinges 134 permitting rotational movement of lid 136 with respect to case body 132. Hinges 134 may have a first leaf fastened to lid 136 and a second leaf fastened to case body 132 to allow lid 136 to be opened and closed. In other non-limiting embodiments storage case 130 may be opaque or translucent. Case body 132, hinges 134, and lid 136 are preferably formed from thicker durable optically clear cast acrylic sheets but may also be formed from, opaque acrylic, transparent rubber, other transparent plastic or glass. While the illustrated storage cases 130 are without any color, other embodiments may fabricate one or more of the components from colored transparent or opaque acrylic and acrylic with decals or etching on the surface of case body 132 or lid 136.

A locking cam system may be placed on lid 136 configured to protract and retract at least one male locking component to prevent unwanted access into case body 132. The male locking component is partially inserted into a latch on case body 132 in the locked position, preventing movement of lid 136 in relation to case body 132, and released from the latch on case body 132 in the unlocked position allowing the user to remove lid 136 from case body 132.

Case body 132 may have one or more stabilizing pieces 139 integrated within the interior of case body 132 such that when an entertainment system is positioned inside case body 132, the entertainment system is partially suspended, such that entertainment systems do not bounce around inside case body 132.

Surfaces of case body 132 may have one or more other different shaped apertures 133 to prevent obstruction of any features of an intended entertainment system that are positioned inside case body 132, such as a button (i.e. power button or eject button), charging port, audio-visual ports, a headphone port, a controlling charging port, any USB-A, USB-C, Micro-USB, Lightning, USB-C or other inputs, virtual reality equipment ports, or any other components of entertainment system. Apertures 133 may also be formed to provide ventilation for the entertainment systems to run properly when stored within storage box 130.

Accessory mounts 158 may be fastened to storage case 130 whereby accessory mounts 158 may be bent or flexed such that accessory mounts 158 will support the weight of the retained electronic products or accessories without deforming from the chosen configuration unless enough force is applied by the user. Accessory mounts 158 may have a hook utilized to fasten to one of the apertures in storage case 130. Accessory mounts 158 may have a gooseneck arm extending from and removably attached to the hook on both ends. The gooseneck arm may be a spring made of a high-strength steel to provide strength and flexibility and soft galvanized iron wire that is compressed into the gaps of the spring to provide stiffness and to hold accessory mounts' 158 position. As such, the user connects the hook of accessory mounts 158 to the location chosen, thereby securing accessory mounts 158 in place where it is ready to retain an electronic device such as video game controller, remote control, or other accessory.

Figure 7:
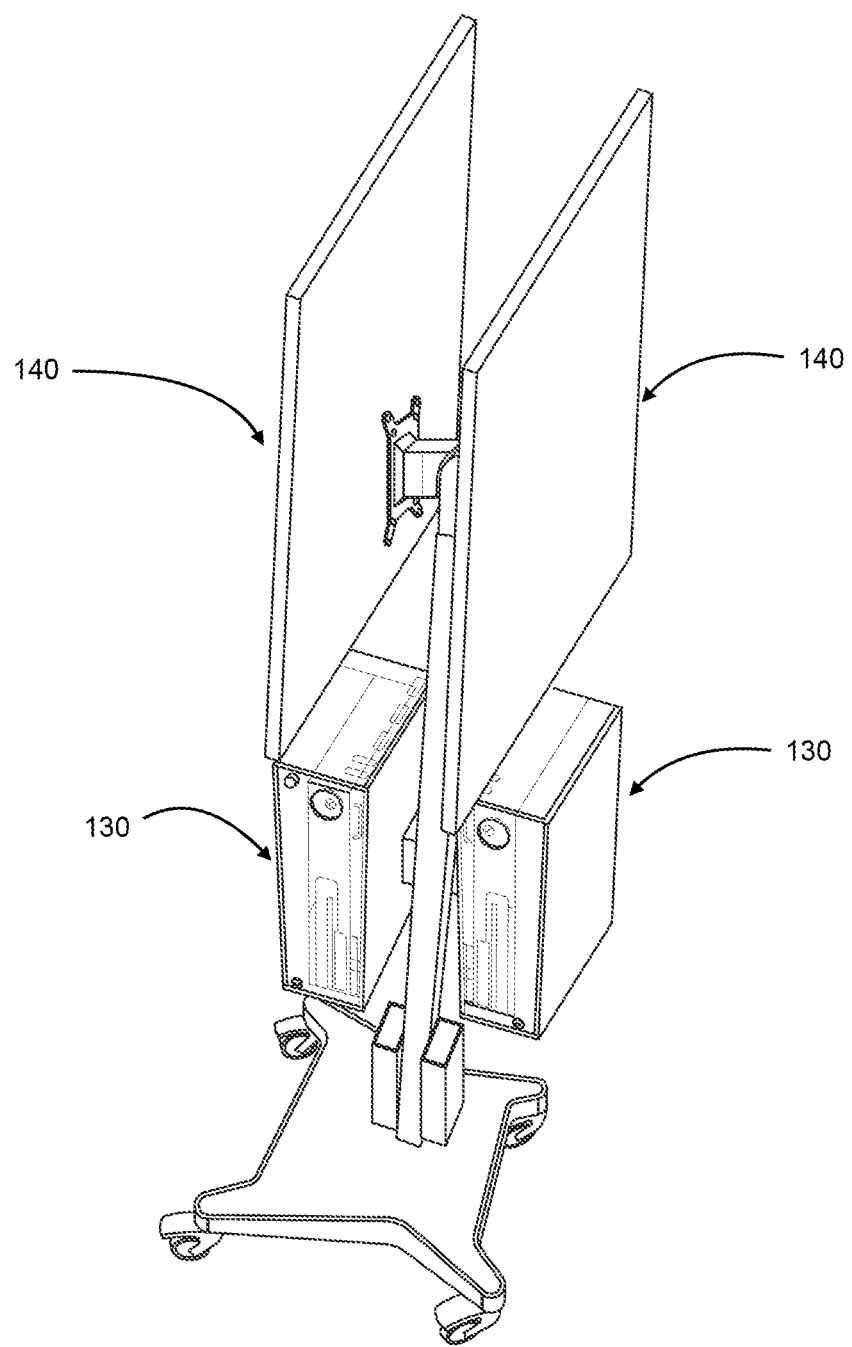
FIG. 7 depicts an illustration of a side view of another embodiment of the entertainment storage portability cart.

FIG. 7 illustrates another embodiment of entertainment storage portability cart 100 with opposing storage cases 130 and display monitors 140 for multiple users to interact with.

When in use, entertainment storage portability cart 100 provides a customizable experience where users may switch out storage cases 130 designed for each entertainment system and connect the entertainment system to the display monitor 140 through entertainment storage portability cart 100 to watch the content produced by the entertainment system. Entertainment storage portability cart 100 may be sold separately or with various entertainment systems and respective storage cases 130. A company or business may purchase entertainment storage portability cart 100 and storage cases 130 separately to accommodate various entertainment systems of patrons and other users.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the use contemplated.

What is claimed is:

1. An entertainment storage portability cart comprising:
   a base;
   one or more support columns connected to the base;
   a toggle connected to the one or more support columns;
   one or more displays connected to the toggle; and
   one or more removably connected storage cases, the one or more removably connected storage cases each configured to hold one or more entertainment systems, the one or more removably connected storage cases have a series of apertures to prevent obstruction and allow airflow from the one or more entertainment systems, the one or more removably connected storage cases removably connected to the one or more support columns.

2. The entertainment storage portability cart of claim 1, further comprising wheels connected to a bottom surface of the base wherein the wheels are position lockable to prevent movement.

3. The entertainment storage portability cart of claim 1, wherein the one or more support columns has a hollow cavity to facilitate routing of cords.

4. The entertainment storage portability cart of claim 3, further comprising a utility box mounted to the one or more support columns, the utility box having an open back end such that cords are movable from the one or more support columns into an interior of the utility box through the open back end.

5. The entertainment storage portability cart of claim 4, further comprising a power strip inside of the utility box, the power strip having a plurality of female power receptacles to receive a series of male adapters from the cords.

6. The entertainment storage portability cart of claim 4, the utility box having a closeable door.

7. The entertainment storage portability cart of claim 1, further comprising a rechargeable battery of charge, design, and capacity, to provide sufficient power to the one or more displays and the one or more entertainment systems secured in storage box while operating the entertainment storage portability cart for a set period of time.

8. The entertainment storage portability cart of claim 1, wherein the toggle is in a pivotable relationship with the one or more support columns such that the one or more displays are adjustable with different orientations.

9. The entertainment storage portability cart of claim 8, the toggle having a bracket for connection to a rear surface of the one or more displays.

10. The entertainment storage portability cart of claim 3, further comprising a handle connected to the one or more support columns, the handle having a hook element configured to allow the cords to be wound about the hook element for storage during transportation.

11. The entertainment storage portability cart of claim 10, the handle having a grasping element configured to allow a user to grab the grasping element to transport the entertainment storage portability cart.

12. The entertainment storage portability cart of claim 1, wherein the one or more removably connected storage cases have a body and a lid, the lid connected to the body by one or more hinges.

13. The entertainment storage portability cart of claim 12, wherein the one or more removably connected storage cases are made of durable optically clear or opaque cast acrylic sheets.

14. The entertainment storage portability cart of claim 13, wherein the one or more removably connected storage cases have a locking system configured to prevent unwanted access into the body of the one or more removably connected storage cases.

15. The entertainment storage portability cart of claim 14, wherein the one or more removably connected storage cases have one or more stabilizing pieces integrated within an interior of the body such that when the one or more entertainment systems are positioned inside the body, the one or more entertainment systems are partially suspended.

16. The entertainment storage portability cart of claim 1, wherein the one or more removably connected storage cases are connected to one or more accessory mounts, the one or more accessory mounts having a curved arching portion to hold one or more accessories outside of the one or more removably connected storage cases.

17. An entertainment storage portability cart comprising:
   a base;
   one or more support columns connected to the base;
   a toggle connected to the one or more support columns;
   one or more displays connected to the toggle;
   one or more removably connected storage cases, the one or more removably connected storage cases each configured to hold one or more entertainment systems, the one or more removably connected storage cases have a series of apertures through multiple surfaces to prevent obstruction and allow airflow from the one or more entertainment systems, the one or more removably connected storage cases removably connected to the one or more support columns; and one or more accessory mounts configured to hold one or more accessories.

18. An entertainment storage portability cart comprising:

one or more connected storage cases, the one or more connected storage cases each designed to hold one or more entertainment systems, wherein the one or more connected storage cases have a series of apertures to prevent obstruction and allow airflow from the one or more entertainment systems, wherein the one or more connected storage cases have one or more stabilizers to hold and partially suspend the one or more entertainment systems within the one or more connected storage cases, the one or more connected storage cases connected to the entertainment storage portability cart.

19. The entertainment storage portability cart of claim 18 further comprising:

one or more accessory mounts to hold one or more accessories outside of the one or more connected storage cases.

\* \* \* \* \*